United States Patent [19]

Caimi et al.

[11] 4,176,108

[45] Nov. 27, 1979

[54] HEAT-COAGULABLE LATEX BINDERS AND PROCESS FOR THE PREPARATION THEREOF

[75] Inventors: Ronald J. Caimi, Somerset; Walter F. Schlauch, Bridgewater, both of N.J.

[73] Assignee: National Starch and Chemical Corporation, Bridgewater, N.J.

[21] Appl. No.: 897,042

[22] Filed: Apr. 17, 1978

Related U.S. Application Data

[63] Continuation-in-part of Ser. No. 828,700, Aug. 29, 1977, abandoned.

[51] Int. Cl.$^2$ ............................................. C08K 3/24
[52] U.S. Cl. .......................... 260/29.6 TA; 260/29.6 H; 260/29.6 M; 427/381; 427/385 B; 427/389; 427/391; 427/392
[58] Field of Search ................. 260/29.6 H, 29.6 TA; 526/320; 428/290; 427/381, 385 B, 389, 391, 392

[56] References Cited

U.S. PATENT DOCUMENTS

| | | | |
|---|---|---|---|
| 2,923,653 | 2/1960 | Matlin | 260/29.6 TA |
| 3,231,533 | 1/1966 | Garrett | 260/29.6 TA |
| 3,985,929 | 10/1976 | Bonin | 428/290 |
| 4,045,399 | 8/1977 | Suzuki | 260/29.6 TA |

*Primary Examiner*—Paul R. Michl
*Attorney, Agent, or Firm*—Edwin Szala; Janet E. Hasak

[57] ABSTRACT

An improved latex binder for nonwoven webs comprising an acrylate- and/or vinyl acetate-based copolymer containing 0.1–10% by weight of 2-hydroxyethyl or 2-hydroxypropyl acrylate or methacrylate is prepared by employing in combination with the copolymer 0.2–10% by weight, on latex solids, of anionic surfactant and 0.3–15% by weight, on latex solids, of nonionic surfactant in selected relative proportions and by adding to the copolymer 1–40% by weight, on latex solids, of a water-soluble salt. The resultant binder is characterized by being stable to coagulation at room temperature but coagulable at a temperature between 40° and 85° C. In the preparation of nonwoven fiber material, a nonwoven web is impregnated with the copolymer latex binder, heated to a temperature of within 40° and 85° C. sufficient to coagulate the binder within the web and thus prevent migration, and finally dried to form a chemically bonded, nonwoven fiber material in sheet form.

10 Claims, No Drawings

HEAT-COAGULABLE LATEX BINDERS AND PROCESS FOR THE PREPARATION THEREOF

This application is a continuation-in-part of our co-pending U.S. application Ser. No. 828,700 filed Aug. 29, 1977 now abandoned.

BACKGROUND OF THE INVENTION

I. Field of the Invention

This invention relates to an improved copolymer latex binder and a process for the preparation thereof. This invention is also directed to a process for preparing chemically bonded, nonwoven fiber material using the copolymer latex binder herein.

II. Description of the Prior Art

Nonwoven fiber materials, generally prepared by randomly depositing individual fibers to form a web, impregnating the web with a binder to hold the individual fibers together, and then heating the web at a set temperature, are known to possess distinct advantages over conventional woven materials. Among the advantageous properties characterizing the nonwoven fiber materials are absence of ravelling, smoother surfaces, increased softness, improved hand, greater absorbency, higher loft, and the like.

The binders used to impregnate nonwoven webs are typically aqueous dispersions of copolymer latices which form rubbery or elastic films upon drying. A wide variety of copolymers are known in the art to be used in latex binders. Typical of these copolymers are butadiene copolymers such as butadiene-styrene-acrylonitrile, alkyl acrylate copolymers, rubbery chloroprene copolymers, vinyl and vinylidene ester copolymers, and the like. These copolymers may contain (i.e., be prepared with) any of a wide variety of polymerizable and/or crosslinkable comonomers such as, for example, substituted alkyl acrylate esters such as 2-hydroxyethyl acrylate; vinyl halides; vinyl esters; ethylenically unsaturated amides such as acrylamide and N-methylolacrylamide; and the like. Typical copolymers of this type employed in latex binders for nonwoven fiber material are described in, for example, U.S. Pat. Nos. 3,985,929; 3,231,533; and 2,984,588.

When a nonwoven web impregnated with a latex binder is dried, the latex particles that were evenly distributed throughout the web on wet application may move to the surface of the web, resulting in nonuniform distribution of the latex throughout the web and lowered physical properties, manifested generally in an increase in the fabric hand. In extreme cases, such binder migration can cause delamination of the treated web into two separate pieces.

Binder migration is favored by thick webs, low binder-to-water ratios, sudden rapid heat increase, and/or very stable latex binders. Efforts to control migration by inhibiting binder movement include adding thickeners or heat-sensitizing agents to the binder either before or after application of the binder to the web. Heat-sensitizing agents inhibit binder migration by lowering the temperature at which coagulation, or phase inversion, occurs in the binder.

Early examples of heat-sensitizing agents are emulsified salts that dissolve when the temperature is raised electrolytic salts such as zinc salts and ammonium and multivalent salts (e.g., aluminum sulfate) for anionic latex binders; cationics such as quaternary amines; and surfactants or protective colloids having inverse solubility, e.g., organic polysiloxanes, polyvinyl methyl ethers, etc. This latter group of compounds functions by precipitating out of the latex as the temperature is raised (see J. R. Holker, "Formed Fabrics Industry", June, 1976, pp. 26–30).

Many of the heat-sensitizing agents of the prior art, however, prove to be unsatisfactory in one or more respects. Thus, a nonwoven web impregnated with a latex binder containing certain of the early sensitizing agents is not sufficiently resistant to solvent, may easily swell in plasticizers, or may have nonuniform bonding of the latex. Furthermore, when an electrolytic salt is used as heat-sensitizing agent, depending on the particular copolymer and the amount of salt added, the binder itself may become destabilized upon addition of salt and coagulate at room temperature. For example, it is well known that copolymer latex systems based on butadiene-styrene-acrylonitrile copolymers are rendered mechanically unstable and coagulate at room temperature upon addition of a salt thereto. In contrast, there are latex binders for nonwoven materials which are stable upon addition of up to large amounts of a salt thereto, i.e., they will not coagulate at any temperature (see U.S. Pat. No. 3,925,288). The salt-containing latex binders which coagulate with heat, however, do not have a definite coagulation temperature and undesirably tend to coagulate over a wide range of temperatures.

An acrylate-based polymer latex containing anionic surfactant wherein multivalent salts or cationics such as quaternary amines are used as heat-sensitizing agents is taught by D. Strong and J. Brodnyan in TAPPI, Vol. 58, No. 11, November, 1975, pp. 133–135. In this process the salt must be added to the web after the web has been impregnated with the latex binder. If the salt is added to the latex binder prior to impregnation of the web, the latex becomes mechanically destabilized and thus useless for impregnating purposes. In addition, if the multivalent salt or amine is used in amounts greater than about 5%, the latex will coagulate at room temperature.

New heat-sensitizing agents and improvements in prior art sensitizing agents have been discovered. For example, addition of certain organic acids to latex binders containing silicone polyether allows for the use of lesser amounts of latex binder (see U.S. Pat. No. 3,714,101). Relatively new heat-sensitizing agents for latex binders include functional propylene oxide-ethylene oxide block copolymers and propylene oxide adducts of triethanolamine or ethylenediamine (see German Pat. No. 2,263,921). However, there is a need in the art for a simple, relatively inexpensive heat-sensitizing agent which stabilizes a latex binder at room temperature but causes coagulation of the binder upon heating to a well-defined temperature. The limitation on the use of simple electrolytic salts as heat-sensitizing agents for latex binders, due to their destabilizing or overstabilizing effects mentioned above, has not been overcome in the prior art.

Accordingly, it is an object of the present invention to provide an improved copolymer latex binder containing a heat-sensitizing agent which binder is mechanically stable at room temperature.

It is another object to provide an aqueous copolymer latex binder for nonwoven webs which coagulates upon heating to a definite temperature below the drying temperature of the web.

It is further object to provide a heat-coagulate copolymer latex binder which, when used to impregnate nonwoven webs, does not migrate to the surface of the web during the drying operation.

It is a still further object to provide a process for preparing a heat-coagulable copolymer latex binder which can be used to prepare chemically bonded, nonwoven fiber material.

SUMMARY OF THE INVENTION

The above and related objects are achieved in a process for preparing copolymer latex binders of the type wherein the copolymer latex is formed with acrylate or vinyl acetate monomers or mixtures thereof and from 0.1–10% by weight of 2-hydroxyethyl or 2-hydroxypropyl acrylate or methacrylate monomers, in which the improvement comprises employing in combination with the copolymer a surfactant system consisting of 0.2–10% by weight, based on latex solids, of an anionic surfactant and 0.3–15% by weight, on latex solids, of a nonionic surfactant, wherein the ratio of anionic to nonionic surfactant is between 1:1.5 and 1:3, and adding to the copolymer from 1 to 40% by weight, based on latex solids, of a water-soluble salt, the resulting latex binder being characterized by its stability to coagulation at room temperature and its ability to coagulate at a temperature between 40° and 85° C.

The preferred copolymer latex herein is that formed with a mixture of acrylate and vinyl acetate monomers.

The preferred acrylate-based copolymers herein contain ethyl acrylate, butyl acrylate, 2-ethylhexyl acrylate, and methyl methacrylate. The preferred copolymers contain 1–3% by weight of the mers derived from 2-hydroxyethyl acrylate or 2-hydroxypropyl acrylate, based on total copolymer weight. Optionally, the copolymer may additionally include mers derived from N-methylolacrylamide in an amount of 0.1–4% by weight of the copolymer.

In another preferred embodiment, the amount of water-soluble salt used is 2–5% by weight and the latex binder contains 1–6% by weight of total anionic and nonionic surfactant with a ratio of anionic to nonionic surfactant of 1:2.

In the process for preparing chemically bonded, nonwoven fiber material using the copolymer latex binder herein, a nonwoven web is impregnated with the binder, heated to a temperature sufficient to coagulate the binder within the web, and finally dried.

The process disclosed herein has distinct advantages over the prior art in that the latex binder is mechanically stable at room temperature and coagulates only upon heating to a well-defined temperature upon addition of a salt. Furthermore, the salt is added to the latex before the nonwoven web is impregnated with the binder, and the pH of the binder need not be adjusted prior to impregnation of the web. The 2-hydroxyethyl or 2-hydroxypropyl acrylate or methacrylate monomer must be incorporated into the copolymer to observe the desired heat-coagulable properties in the resultant latex binder.

After heat coagulation takes place in the nonwoven web, squeezing of the web will result in the extrusion of water, but not latex binder, from the web. Because the binder heat-coagulates at a certain desired temperature, no observable binder migration occurs in the drying operation and, hence, the chemically bonded, nonwoven fiber material produced by the process herein offers excellent resistance to delamination and has good internal bond strength.

DESCRIPTION OF THE PREFERRED EMBODIMENTS

The copolymers employed in the latex binders of this invention are copolymers in latex form of which at least 86% by weight, and preferably 95% by weight, is an acrylate or methacrylate ester or vinyl acetate, or mixtures thereof. Copolymers of the type disclosed herein are well known in the art.

Suitable acrylate or methacrylate monomers for the copolymers herein are esters of (meth)acrylic acid of the general formula:

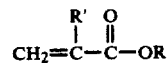

wherein R is an alkyl, alkenyl or aryl group and R' is hydrogen or a methyl group. Representative of such esters are methyl acrylate, ethyl acrylate, allyl acrylate, butyl acrylate, hexyl acrylate, 2-ethylhexyl acrylate, methyl methacrylate, and the like. Mixtures of two or more of these esters may also be present in the copolymer, if desired.

As an alternative to acrylate monomers, vinyl acetate may be the main component of the copolymer as mentioned above. In addition, mixtures of vinyl acetate and one or more acrylate esters may form the basis of the copolymer.

As specified hereinabove, the copolymer used in the latex binder of this invention must contain from 0.1 to 10% by weight of the mers derived from 2-hydroxyethyl acrylate (or equivalent monomers) in order to obtain a binder with the required coagulation properties. It has been found that omission of this monomer from the copolymer results in a latex binder which will coagulate in an uncontrollable manner only at very high temperatures, if at all. However, if the copolymer contains more than about 10% of 2-hydroxyethyl acrylate or its equivalents, the binder prepared therefrom will be too viscous and will coagulate at temperatures of less than about 40° C. Thus, the specific amount of 2-hydroxyethyl acrylate to be present in the copolymer will depend on the coagulation temperature and latex viscosity desired. Use of 2-hydroxyethyl acrylate monomer is preferred over use of the equivalent acrylate monomers referred to above.

The copolymer herein optionally contains a small amount, i.e., about 0.1–4%, by weight of the copolymer, of N-methylolacrylamide, which is a crosslinkable comonomer capable of undergoing further reaction after the latex binder is applied to the web. The upper limit of N-methylolacrylamide which can be tolerated will be determined by viscosity considerations since the comonomer is water soluble. Incorporation of N-methylolacrylamide into the copolymer to lend freeze-thaw stability and other desirable properties to the resultant latex binder is well known in the art.

The copolymers of the present invention are produced by conventional emulsion polymerization procedures, employing a surfactant system consisting of a mixture of an anionic and nonionic surfactant. The surfactants may be charged at the outset of the polymerization or may be added incrementally or by proportioning throughout the run. In addition, some surfactant may be added to the copolymer latex after polymerization is complete. However, a certain amount of surfactant must always be present initially in the monomer mixture in order to effect polymerization. The actual amount required during polymerization depends on many factors such as the particle size desired, etc. The total amount of anionic surfactant in the latex may range from about 0.2 to 10% by weight, based on latex solids, and the total amount of nonionic surfactant from 0.3 to 15% by weight, with the preferred amount of total surfactant being from 1 to 6% by weight. The balance between anionic and nonionic surfactants in the latex is a critical one, and the optimum ratio of anionic to nonionic surfactant must be determined for each particular copolymer used. An excess of nonionic surfactant will result in a latex which is too stable and will never coagulate; on the other hand, too much anionic surfactant will completely destabilize the latex and cause coagulation at room temperature. Generally, the ratio of anionic to nonionic surfactant will be from 1:1.5 to 1:3, with the preferred ratio being 1:2.

Typical anionic surfactants which may be employed are those known in the art, including the higher fatty alcohol sulfates such as, e.g., sodium lauryl sulfate, ethanol amine lauryl sulfate and ethyl amine lauryl sulfate; alkali metal and ammonium salts of sulfonated petroleum or paraffin oils; alkali metal higher alkyl sulfosuccinates such as the dihexyl and dioctyl esters of sodium sulfosuccinic acid; sodium N-methyl-N-palmitoyl taurate; sodium oleyl isethionate; sodium salts of aromatic sulfonic acids such as dodecane-1-sulfonic acid and octadiene-1-sulfonic acid; alkali metal salts of alkyl aryl polyethoxyethyl sulfates or sulfonates, e.g., sodium t-octylphenoxypolyethoxyethyl sulfate having 1 to 5 oxyethylene units; alkyl aryl sulfonates, e.g., sodium or potassium isopropyl benzene sulfonates or isopropyl naphthalene sulfonates; and the like. Suitable nonionic surfactants include aryl alkyl polyether alcohols such as t-octyl- and nonylphenyl polyethoxyethanol and the like.

To initiate polymerization, a free radical catalyst is generally employed to insure a more uniform and controllable polymerization and a satisfactory polymerization rate. Common free radical initiators include various peroxygen compounds such as peroxydisulfates, sodium or potassium persulfate, hydrogen peroxide, benzoyl peroxide, t-butyl hydroperoxide, 1-hydroxycyclohexyl hydroperoxide, and other water-soluble peroxides. Also useful are the reducing agent types such as the alkaline earth metal formaldehyde sulfoxylates, bisulfites, metabisulfites, and zinc formaldehyde sulfoxylates, etc. Especially useful initiators are the water-soluble peroxygen compounds such as hydrogen peroxide and the sodium, potassium and ammonium persulfates and formaldehyde sulfoxylates. In general, the amount of initiator present will be from 0.1 to 2.0% by weight of the polymerizable composition, and preferably 0.2 to 0.5%.

When emulsion polymerization is complete, the resultant copolymer latex is mixed with a water-soluble salt as heat-sensitizing agent using any suitable technique which insures complete and thorough dispersal of the ingredients. The term "water-soluble salts" as used herein refers to mono- and multivalent electrolytic salts capable of completely dissolving in water. Examples of such salts include sodium and potassium chloride, sodium bromide, sodium acetate, sodium sulfate, ammonium sulfate, ammonium chloride, magnesium chloride, calcium chloride, calcium nitrate, aluminum sulfate, aluminum chloride, aluminum acetate, zinc chloride, zinc sulfate, and the like. The preferred salts for use herein are chloride salts, and most preferred of these are sodium chloride and ammonium chloride.

The amount of salt added to the latex may range from 1 to 40% by weight, based on the weight of latex solids. Salt employed in amounts of less than 1% is not effective in rendering the latex binder heat coagulable; however, too much salt will cause the latex binder to coagulate at room temperature. The preferred amount of salt employed is 2-5% by weight.

The amount of solids in the latex prior to addition of salt is ordinarily about 50% by weight. After the salt is added, the latex binder is diluted with water for actual applications to about 2-55% by weight bath solids.

When mixed with an amount of the salt within the range specified above, the latex binder is stable at room temperature and may be stored indefinitely at that temperature until ready to be used. The binder should not, however, be stored at temperatures of over 30° C. Upon heating to a temperature within the range of 40°–85° C., the latex binder will coagulate, with the particular coagulation temperature depending on the copolymer used, the amount of latex solids, the type and relative amounts of surfactants, the type and amount of salt used, etc.

The copolymer latex binder of this invention may be used to prepare chemically bonded, nonwoven fiber material by impregnation of a nonwoven web with the binder. Any fiber which has the required specifications to be formed into a nonwoven web may be used for this purpose. The fibers from which the webs may be made include natural fibers such as cotton, wool, silk, cellulose, sisal, cantala, henequen, hemp, jute and kenaf. Synthetic fibers may also be employed and include rayon; cellulose esters such as cellulose acetate and cellulose triacetate; proteinaceous fibers such as those made from casein; polyamides such as nylon; polyesters such as polyethylene glycol terephthalate; acrylic fibers containing a minimum of about 85% acrylonitrile copolymerized with vinyl chloride, vinyl acetate, vinyl pyridine, methacrylonitrile, or the like and the so-called modacrylic fibers containing smaller amounts of acrylonitrile; vinyl resin fibers such as the copolymer of vinyl chloride and vinyl acetate; fibers obtained from the formal derivatives of polyvinyl alcohol; olefin fibers such as polyethylene and polypropylene; siliceous fibers such as glass and mineral wools; and the like.

The term "nonwoven web" as used herein refers not only to nonwoven webs formed by dry-laying, but also to those nonwoven materials formed by wet-laying processes, and, in particular, paper sheets. The copolymer latex binder herein is particularly advantageous in preparing specialty papers which require specific binders in order to modify the structural properties of the paper. Papers obtained from bleached or nonbleached pulp may be employed as well as those obtained by the unbleached sulfite, bleached sulfite, unbleached sulfate (kraft), semibleached and bleached sulfate processes. Papers prepared wholly from synthetic fibers and those obtained from blends of natural cellulose and synthetic fibers may also be employed.

The non-woven web may be formed using any of the conventional techniques. For example, in preparing paper the web will be formed on a moving fine wire screen from an aqueous suspension of the fibers. Other fibers which are to be formed into a nonwoven web may be formed by such techniques as carding, garnetting, deposition from an air suspension of the fibers, deposition from solution, deposition from a melt, wet-laying, or the like, the particular method used being dependent on the particular fiber or fiber blend employed, the thickness of the web, whether the fibers are to be oriented or deposited at random, etc. The web formed by carding techniques may be obtained from a single card, but it is generally preferred to superpose a plurality of such webs to build up the mat to sufficient thickness for the end use intended. In building up such a mat, alternate layers of carded webs may have their fiber orientation directions disposed at 60 or 90 degree angles with respect to intervening layers.

The copolymer latex binder may be applied to the nonwoven web or mat of fibers in any suitable manner such as by spraying, dipping, roll coating, padding, or the like. The pH of the binder ranges from 2 to 9 and need not be adjusted prior to the impregnation step. The concentration of latex binder should be from 5 to 150% by weight at the time of application to the web, although higher or lower amounts may be used as necessary. Application of the binder is normally carried out at room temperature to facilitate cleaning of the apparatus employed for the impregnating step. The binder may be applied to one or both surfaces of the web or may be distributed through the interior as well.

Other binders such as glue can be applied in conjunction with the latex binder of this invention if desired. However, use of an adhesive in such applications is not necessary for the purpose of this invention. The latex binder may also contain either a foaming agent to provide the binder in a foamed condition in the final product, or a defoamer when the ingredients of the latex have a tendency to give rise to foaming which is in a particular case undesirable. Conventional foaming and defoaming agents may be used such as sodium soaps including sodium oleate for foaming and octyl alcohol or certain silicones for defoaming.

After the impregnation step the nonwoven web is heated to a temperature within the range of 40° to 85° C., preferably 50°-65° C., to effect coagulation of the latex binder within the web. The time period for heating necessary to effect coagulation depends on such factors as the line speed, the thickness of the web, etc. When coagulation is complete, the web may be squeezed of any excess water without at the same time losing the latex binder. The binder is uniformly distributed throughout the web and will not migrate upon drying.

The drying of the web is normally conducted by passing the fiber material through one or more ovens or heating chambers maintained at a temperature between about 93° and 163° C., and preferably 105° and 140° C. The conditions of drying are controlled so that no appreciable deterioration or degradation of the fibers or copolymer occurs. The time required for drying will depend on the thickness of the web, the line speed, the amount of binder used, the solids content in the binder, etc., but generally drying is carried out until the ultimate physical characteristics of the finished fiber material are developed.

The finished article obtained by impregnation using the binder of this invention is a chemically-bonded, nonwoven fiber material characterized by its improved internal bond strength or resistance to delamination. This property is due to the fact that the latex binder coagulates and hence precludes binder migration toward the surface of the web as the water is removed in the drying step. The resulting fiber material may be used in any application wherein nonwoven materials are employed. One suitable use of the material is as artificial leather in such applications as belts, carrying cases, shoe insoles, and the like. Another use is as a paper product.

The following examples will more fully illustrate the embodiments of the present invention. In these examples, all parts and percentages are given by weight and all temperatures in degrees Celsius unless otherwise noted.

EXAMPLE 1

This example illustrates the preparation of a heat-coagulable copolymer latex binder in accordance with the process of this invention.

A copolymer latex was prepared by the emulsion polymerization of 75 parts vinyl acetate, 25 parts butyl acrylate, 2 parts 2-hydroxyethyl acrylate, and 2 parts N-methylolacrylamide in the presence of a surfactant system using sodium persulfate as the free radical initiator. The surfactants employed were as follows: 2.25 parts dihexyl ester of sodium sulfosuccinic acid, 0.02 parts dioctyl ester of sodium sulfosuccinic acid, 0.5 parts sodium alkyl aryl sulfonate, as anionic surfactants, and 4.2 parts alkyl aryl polyether ethanol as the nonionic surfactant. A total of 5 parts ammonium chloride, based on 100 parts latex solids, was then added to the copolymer latex and mixed thoroughly therewith to give a binder having a pH of 3.5 and a solids content of 50.5%. Upon addition of the salt, no coagulation of the binder was observed at room temperature.

The heat coagulation temperature of the latex binder was evaluated as follows: The latex binder above was diluted with water to 40% bath solids. A total of 100 grams of the diluted binder was placed in a 150-ml. beaker. The beaker was then immersed to two-thirds of its height in a hot water bath at 90° C. and the latex binder stirred with a thermometer. The coagulation temperature was the temperature at which the binder completely coagulated. When the binder prepared as above was subjected to this test, coagulation began to occur at 39° C. and was complete at 42° C. The resulting coagulate was white and lumpy in appearance.

EXAMPLES 2-11

These examples illustrate the preparation of various types of copolymers for use in the latex binders of this invention.

The latex binders of Table I were prepared as described in Example 1 using the indicated copolymers in the given amounts. The surfactant system used was the same as in Example 1 except that in Examples 5-9, the amount of sodium alkyl aryl sulfonate was 0.6 parts instead of 0.5 parts and the amount of dihexyl ester of sodium sulfosuccinic acid was 1.48 parts instead of 2.25 parts. In addition, in Examples 2-4, 1.6 parts of dihexyl ester of sodium sulfosuccinic acid was employed. Ammonium chloride was used as the heat-sensitizing agent in all cases in amounts of 5% by weight, based on latex solids. All of the binders tested were stable at room temperature. The coagulation temperature of each binder was then evaluated as described in Example 1 and is indicated in Table I. In all cases the coagulation was rapid, occurring within a range of 2°-3° C., and a white, pasty coagulate was obtained.

TABLE I

| Monomers | 2 | 3 | 4 | 5 | 6 | 7 (parts) | 8 | 9 | 10 | 11 |
| --- | --- | --- | --- | --- | --- | --- | --- | --- | --- | --- |
| Vinyl acetate | 75 | 85 | 15 | 50 | 50 | 50 | 70 | 100 | — | — |
| Butyl acrylate | 25 | 15 | 85 | 50 | 50 | 50 | — | — | 20 | — |
| Ethyl acrylate | — | — | — | — | — | — | — | — | 80 | 80 |
| Methyl methacrylate | — | — | — | — | — | — | — | — | — | 20 |
| 2-Ethylhexyl acrylate | — | — | — | — | — | — | 30 | — | — | — |
| 2-Hydroxyethyl acrylate | 2 | 2 | 2 | 3 | 2 | — | 2 | 3 | 2 | 2 |
| 2-Hydroxypropyl acrylate | — | — | — | — | — | 2 | — | — | — | — |
| 2-Hydroxypropyl acrylate | — | — | — | — | — | 2 | — | — | — | — |
| N-Methylolacrylamide | 2 | 2 | 2 | — | 2 | 2 | 2 | 2 | 2 | 2 |
| Coagulation temperature of binder (°C.) | 52 | 40 | 65 | 65 | 80 | 67 | 56 | 62 | 75 | θ |

EXAMPLE 12

This example illustrates the effect of various water-soluble salts on the heat coagulation of a latex binder of this invention.

A copolymer latex binder was prepared by the emulsion polymerization of 50 parts butyl acrylate, 50 parts vinyl acetate, 3 parts 2-hydroxyethyl acrylate, and 1 part N-methylolacrylamide using sodium persulfate as the free radical initiator. The surfactants in this system were the same as those of Example 1. Five parts of the salt indicated in Table II, based on 100 parts of the latex solids, was added to and thoroughly mixed with the copolymer latex, which was then diluted to 40% bath solids. In every case the latex binder was stable at room temperature upon mixing the salt therewith. When heated as described in Example 1, the binder coagulated at the temperatures indicated in Table II.

TABLE II

| Salt | Coagulation Temperature (°C.) |
| --- | --- |
| Aluminum chloride | 72 |
| Calcium chloride | 68 |
| Ammonium chloride | 62 |
| Sodium chloride | 66 |
| Aluminum sulfate | 76 |
| Alumium acetate | 83 |
| Sodium bromide | 75 |
| Calcium nitrate | 78 |
| Magnesium chloride | 66 |

All of the salts tested render the latex binder coagulable within the desired temperature range.

EXAMPLE 13

This example illustrates the effect of salt concentration on coagulation of the copolymer latex binder of this invention.

A copolymer latex binder was prepared by the emulsion polymerization of 50 parts butyl acrylate, 50 parts vinyl acetate, 3 parts 2-hydroxyethyl acrylate and 2 parts N-methylolacrylamide using sodium persulfate as free radical initiator. The surfactants employed were in the same amounts as those of Examples 5–9. Ammonium chloride was then added to the latex in the amounts indicated in Table III. The resulting binders were evaluated for heat coagulation as in Example 1 and the temperatures indicated in Table III.

TABLE III

| Amount of Ammonium Chloride (% by weight) | Coagulation Temperature (°C.) |
| --- | --- |
| 0 (control) | > 90≠ |
| 5 | 64 |
| 10 | 60 |
| 20 | 46 |
| 30* | 42 |
| 40** | 37 |
| 50*** | 30 |

*Reduces bath solids to 38%.
**Reduces bath solids to 35%.
***Reduces bath solids to 33%.
≠The control does not really coagulate, even at temperatures above 90° C. The water evaporates from the latex, increasing the solids such that a pasty material is obtained.

The results indicate that some salt must be added to the latex to achieve heat coagulation in the binder, but only up to about 40%. Too much salt will lower bath solids considerably and cause coagulation at temperatures approaching room temperature.

EXAMPLE 14

This example illustrates the effect of hydroxyl content of the copolymer on the coagulation of the latex binder of this invention.

A copolymer latex binder was prepared by the emulsion polymerization of 50 parts butyl acrylate, 50 parts vinyl acetate, 2 parts N-methylolacrylamide and the amount of 2-hydroxyethyl acrylate indicated in Table IV using the same free radical initiator and the same amounts of surfactants as those of Example 13. A total of 5% ammonium chloride, based on latex solids, was then added to the latex. The resulting binders were evaluated for heat coagulation as in Example 1 and the temperatures indicated in Table IV.

TABLE IV

| Amount of 2-Hydroxyethyl Acrylate in Copolymer (% by weight of copolymer) | Coagulation Temperature (°C.) |
| --- | --- |
| 0 (control) | > 90≠ |
| 2 | 80 |
| 3 | 68 |
| 5 | 63 |
| 7.4 | 52 |

≠See note below Table III.

The results indicate that the presence of 2-hydroxyethyl acrylate in the copolymer is essential and that as the amount increases, the coagulation temperature is reduced. No more than about 10% by weight of the copolymer should be composed of 2-hydroxyethyl acrylate (or its equivalents) to obtain good results.

EXAMPLE 15

This example illustrates the use of the latex binders of this invention in preparing nonwoven fiber material.

A nonwoven web consisting of three plies was impregnated at room temperature with 95% by weight of the latex binder of Example 1. The binder was applied to the web by means of rollers. The web was then heated to 50° C. to coagulate the latex binder within the web. When the binder was completely coagulated, the resultant fiber material was squeezed of excess water (the water obtained was colorless, indicating no loss of latex), and then dried in a circulating oven at 105° C. The dried web showed excellent resistance to delamination and had an equal distribution of the binder throughout all three layers thereof as determined by dyeing. Equal dye uptake indicated that the binder was evenly distributed throughout. When the same procedure was repeated except that each of the three plies was dried individually, each ply was found to have good binder distribution throughout as indicated by the dyeing test.

EXAMPLE 16

This example illustrates the effect of the copolymer latex binder of this invention on the internal strength of a nonwoven web.

A nonwoven web consisting of three plies was impregnated at room temperature with 95% by weight of the latex binder of Example 14 containing 5% ammonium chloride at 30% bath solids. The web was treated and dried as described in Example 15 and then cured for 5 minutes at 130° C. The web was then delaminated and each of the individual plies thereof was evaluated for percent pickup, delamination resistance and wet tensile strength as determined by the following test procedures:

Percent Pickup

Each ply is weighed before application of the binder and then after impregnation and drying. The difference in these two weights is the amount of latex solids which was "picked up" by the sample. This value is expressed as a percent of the total weight of the ply.

Delamination Resistance

For a 3.8 cm.×25.4 cm. sample of each ply, two strips of commercially available rug binding tape with a width of 3.8 cm. and a length of 25.4 cm. are cut. Each ply is placed between the two strips of tape with the adhesive-coated sides of the tapes facing the ply. The tape-coated ply is then placed in a heat sealer (with both upper and lower jaw heating elements on) for five 6-sec. intervals at a temperature of 163° C. and a jaw pressure of 4.5 kg. The samples are then conditioned for at least 12 hours and then the initial delamination is begun at one end by pulling the two strips of tape about 3.8 cm. apart. The sample is then split exactly in the center with an equal amount of sample adhered to each tape. The sample is then split 15.2 cm. in an Instron Tensile Tester having a crosshead speed of 3.05 cm./min., a chart speed of 5 cm./min., and a load scale of approximately 2.2 kg. From the Instron chart curve a mean value expressed in kg./cm. is taken for each sample. Larger values indicate greater resistance to delamination.

Wet Tensile

A 1.3 cm.×17.8 cm. sample of each ply is cut and soaked in distilled water for one hour. The jaws of an Instron Tensile Tester are set at 12.7 cm. initial separation, and the machine is set for a jaw speed of 50.8 cm./min. One end of the sample, which is still wet from soaking, is placed in the top jaw and the other end in the lower jaw of the Instron Tester. A curve of tensile force vs. distance stretched is recorded by the machine. Six tests are run on each material and the results averaged. Wet tensile, expressed in kg./cm., is a measure of the internal strength (Z strength) of the sample.

A control latex binder containing the same copolymer and surfactants but without the salt was evaluated by the above test procedures. The results of the evaluations of the test and control binders are summarized in Table V.

TABLE V

| Sample | Ply | Pickup (% by weight) | Delamination Resistance (kg./cm.) | Wet Tensile (kg./cm.) |
|---|---|---|---|---|
| Test | Top | 109 | 1.19 | 5.53 |
| Test | Middle | 80 | 1.08 | 4.30 |
| Test | Bottom | 127 | 1.42 | 5.84 |
| Control | Top | 130 | 1.70 | 5.12 |
| Control | Middle | 36 | 0.45 | 2.40 |
| Control | Bottom | 123 | 1.59 | 4.80 |

The results indicate that migration of the binder throughout the web is prevented by adding the salt, which acts as a heat-sensitizing agent, to the latex prior to impregnation. By controlling binder migration, fairly uniform pickup, internal strength, and resistance to delamination is achieved in the web.

Summarizing, this invention is seen to provide an improved process for preparing copolymer latex binders which are stable at room temperature but coagulate at a selected temperature range well below the drying temperature of a nonwoven web. When the heat-coagulable latex binders of this invention are used to impregnate webs, substantially no binder migration is found to occur in the dried fiber material.

Now that the preferred embodiments of the present invention have been described in detail, various modifications and improvements thereon will become readily apparent to those skilled in the art. Accordingly, the spirit and scope of the invention are to be limited only by the appended claims and not by the foregoing specification.

What is claimed is:

1. In a process for preparing copolymer latex binders of the type wherein the copolymer latex is formed by emulsion polymerization of acrylate or vinyl acetate monomers or mixtures thereof and from 0.1 to 10% by weight of 2-hydroxyethyl or 2-hydroxypropyl acrylate or methacrylate monomers, the improvement which comprises employing in combination with said copolymer a surfactant system consisting of 0.2–10% by weight, based on latex solids, of an anionic surfactant and 0.3–15% by weight, on latex solids, of a nonionic surfactant, wherein the ratio of anionic to nonionic surfactant is between 1:1.5 and 1:3, and adding to said copolymer latex after polymerization from 1 to 40% by weight, based on latex solids, of a water-soluble salt, the resulting latex binder being characterized by its stability to coagulation at room temperature and its ability to coagulate at a temperature between 40° and 85° C.

2. The process of claim 1 wherein said water-soluble salt is a chloride salt.

3. The process of claim 2 wherein said water-soluble salt is sodium chloride or ammonium chloride.

4. The process of claim 1 wherein said copolymer contains mers derived from 2-hydroxyethyl acrylate or 2-hydroxypropyl acrylate.

5. The process of claim 1 wherein said copolymer latex is formed with a mixture of acrylate and vinyl acetate monomers and said acrylate monomers are selected from the group consisting of ethyl acrylate, butyl acrylate, methyl methacrylate, and 2-ethylhexyl acrylate monomers.

6. The process of claim 1 wherein said water-soluble salt is added to said latex binder in an amount of 2-5% by weight, based on latex solids.

7. The process of claim 1 wherein the total amount of anionic and nonionic surfactants in said latex binder is 1-6% by weight, on latex solids, and the ratio of anionic to nonionic surfactant is 1:2.

8. A process for preparing chemically bonded, nonwoven fiber material consisting essentially of the steps of:
 A. preparing a copolymer latex binder by forming a copolymer latex by emulsion polymerization of acrylate or vinyl acetate monomers or mixtures thereof and from 0.1 to 10% by weight of 2-hydroxyethyl or 2-hydroxypropyl acrylate or methacrylate monomers, employing in combination with said copolymer a surfactant system consisting of 0.2-10% by weight, based on latex solids, of an anionic surfactant and 0.3-15% by weight, on latex solids, of a nonionic surfactant, wherein the ratio of anionic to nonionic surfactant is between 1:1.5 and 1:3, and adding to said copolymer latex after polymerization from 1 to 40% by weight, based on latex solids, of a water-soluble salt, the resulting latex binder being characterized by its stability to coagulation at room temperature and its ability to coagulate at a temperature between 40° and 85° C.;
 B. impregnating a nonwoven web with said copolymer latex binder;
 C. heating said impregnated web to a temperature within the range of about 40° to 85° C. sufficient to coagulate the latex binder within the web; and
 D. drying the resultant chemically bonded, nonwoven fiber material.

9. The process of claim 1 or 8 wherein said copolymer contains from 0.1 to 4% by weight of the mers derived from N-methylolacrylamide.

10. The process of claim 1 wherein said water-soluble salt is selected from the group consisting of sodium chloride, potassium chloride, sodium bromide, sodium acetate, sodium sulfate, ammonium sulfate, ammonium chloride, magnesium chloride, calcium chloride, calcium nitrate, aluminum sulfate, aluminum chloride, aluminum acetate, zinc chloride, and zinc sulfate.

* * * * *